July 23, 1946.　　　G. R. WOOD　　　2,404,557
FOOD HANDLING APPARATUS
Filed April 12, 1943　　　8 Sheets-Sheet 1
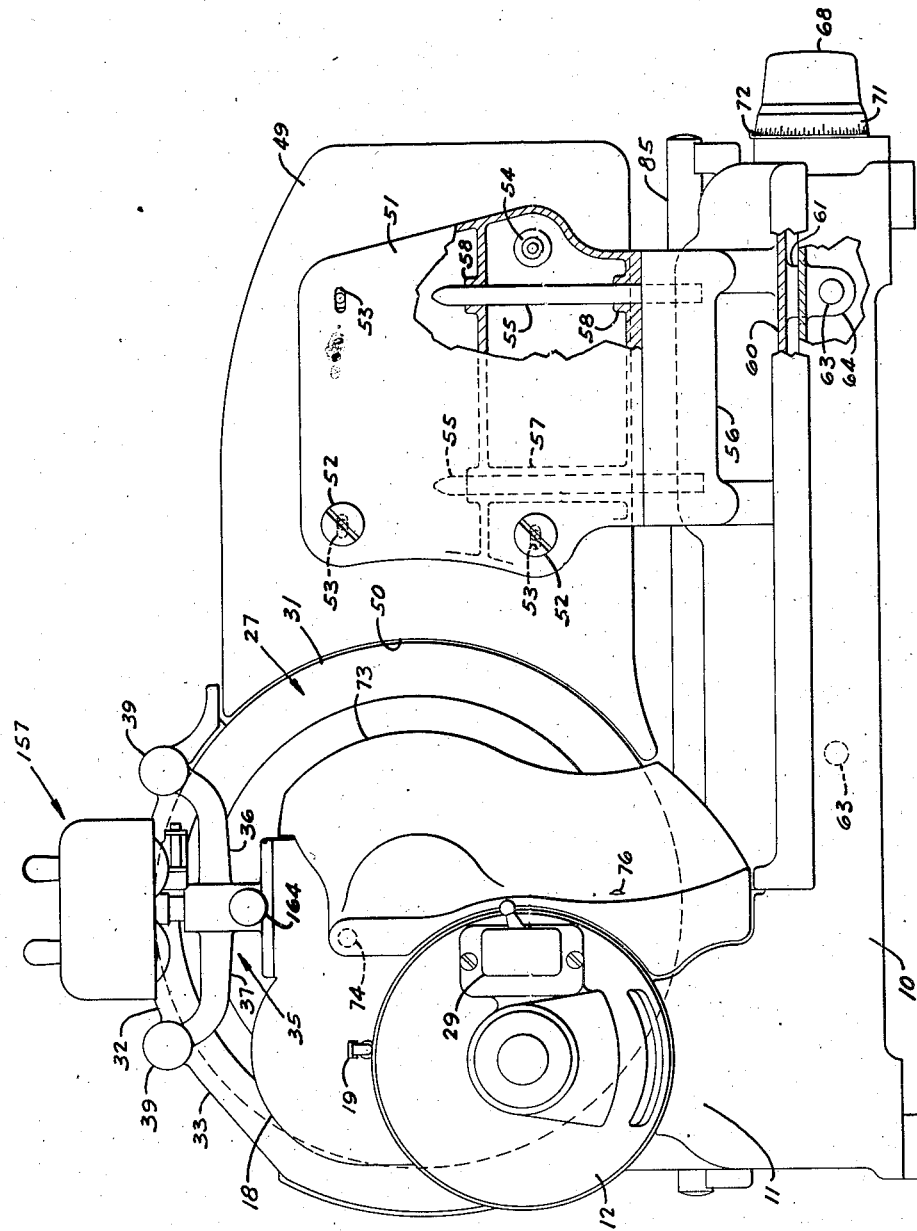
FIG. I
INVENTOR.
GEORGE R. WOOD
BY
*Chas. M. Havell*
ATTORNEY

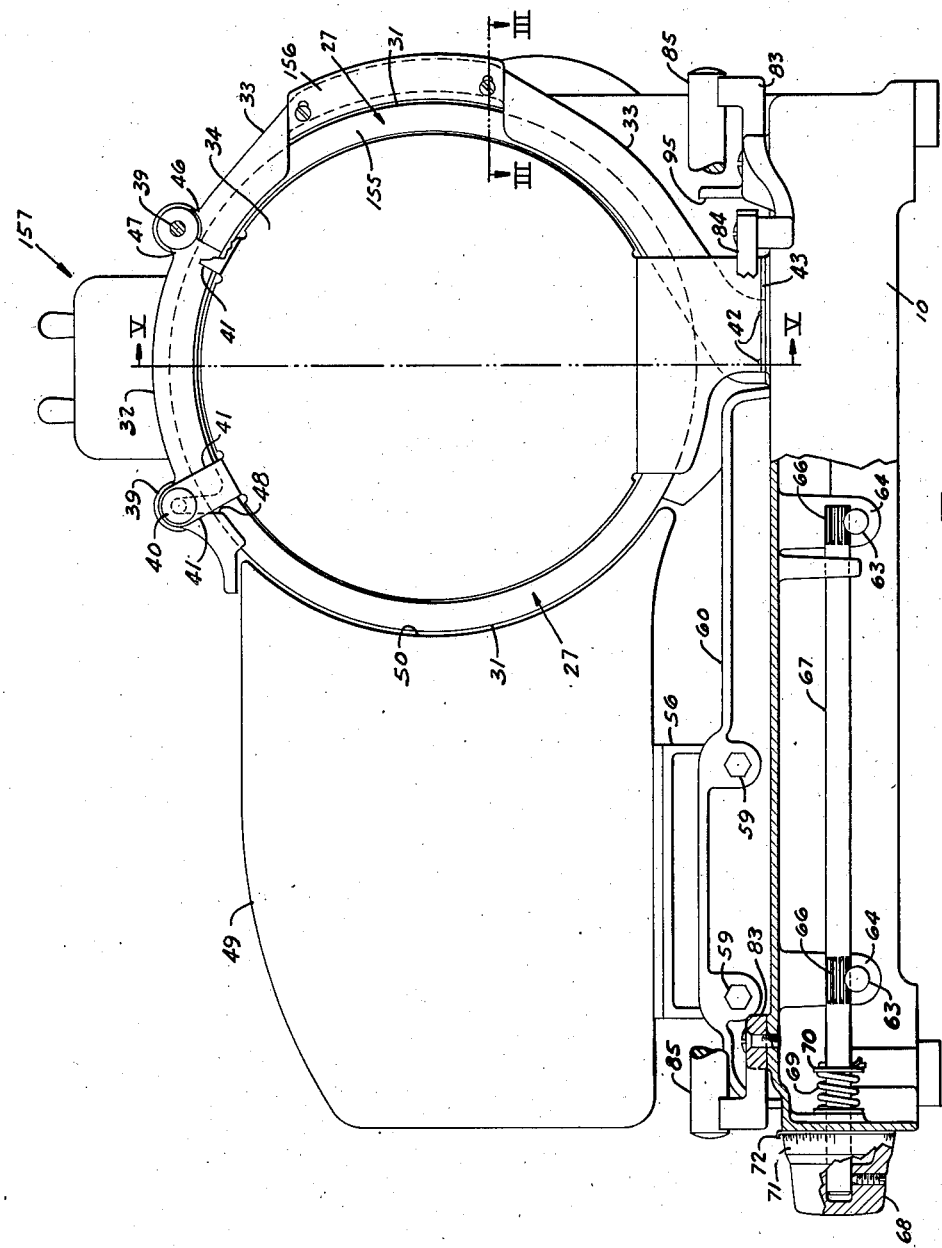

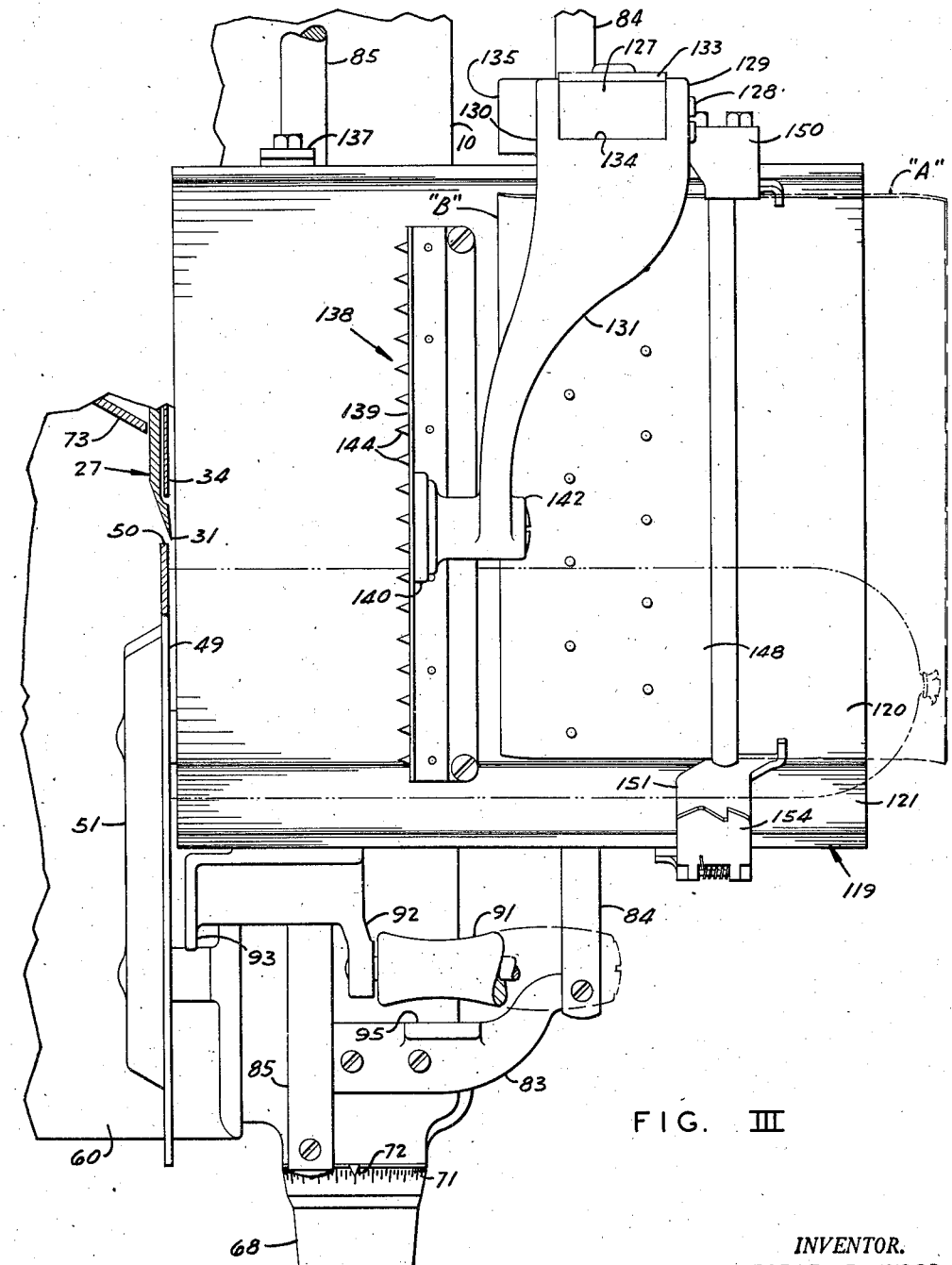
FIG. III

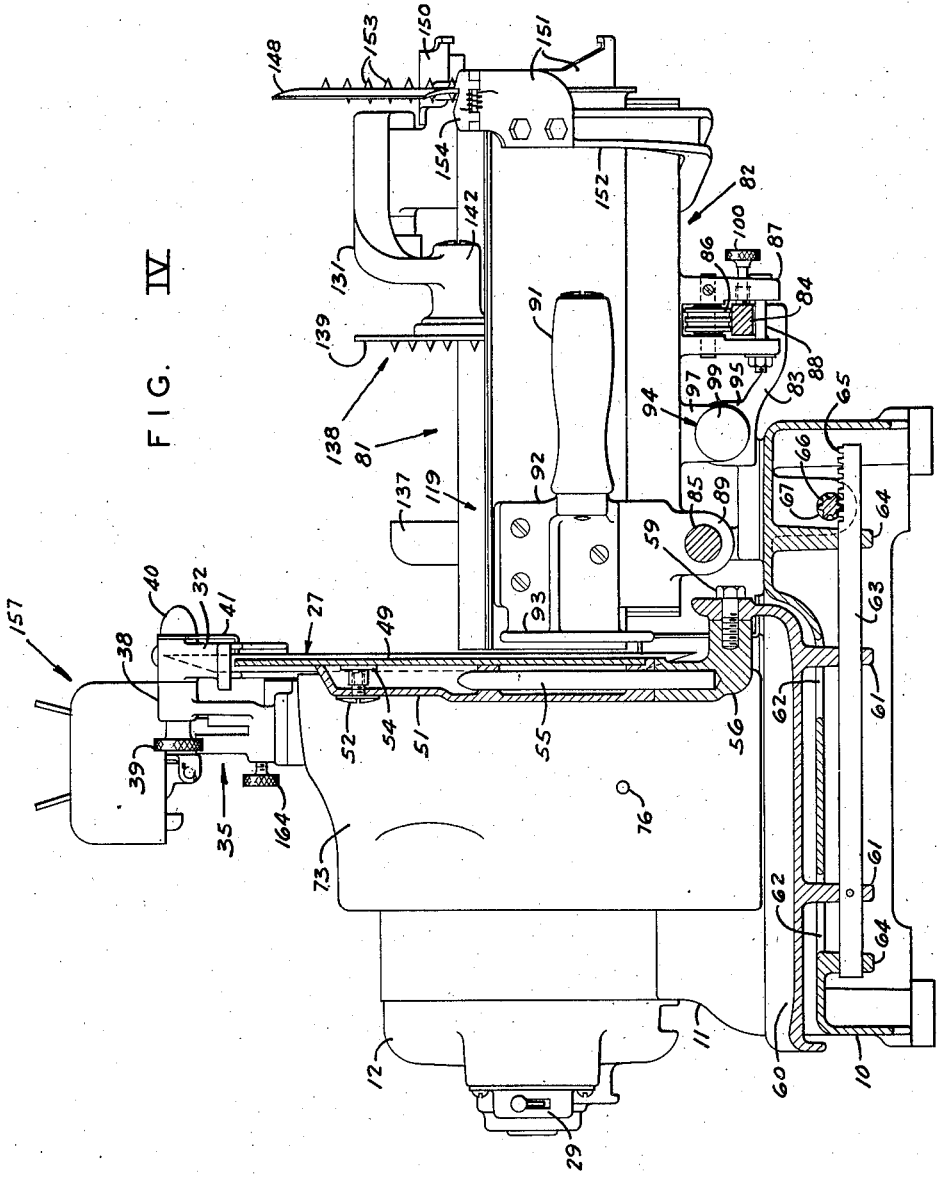

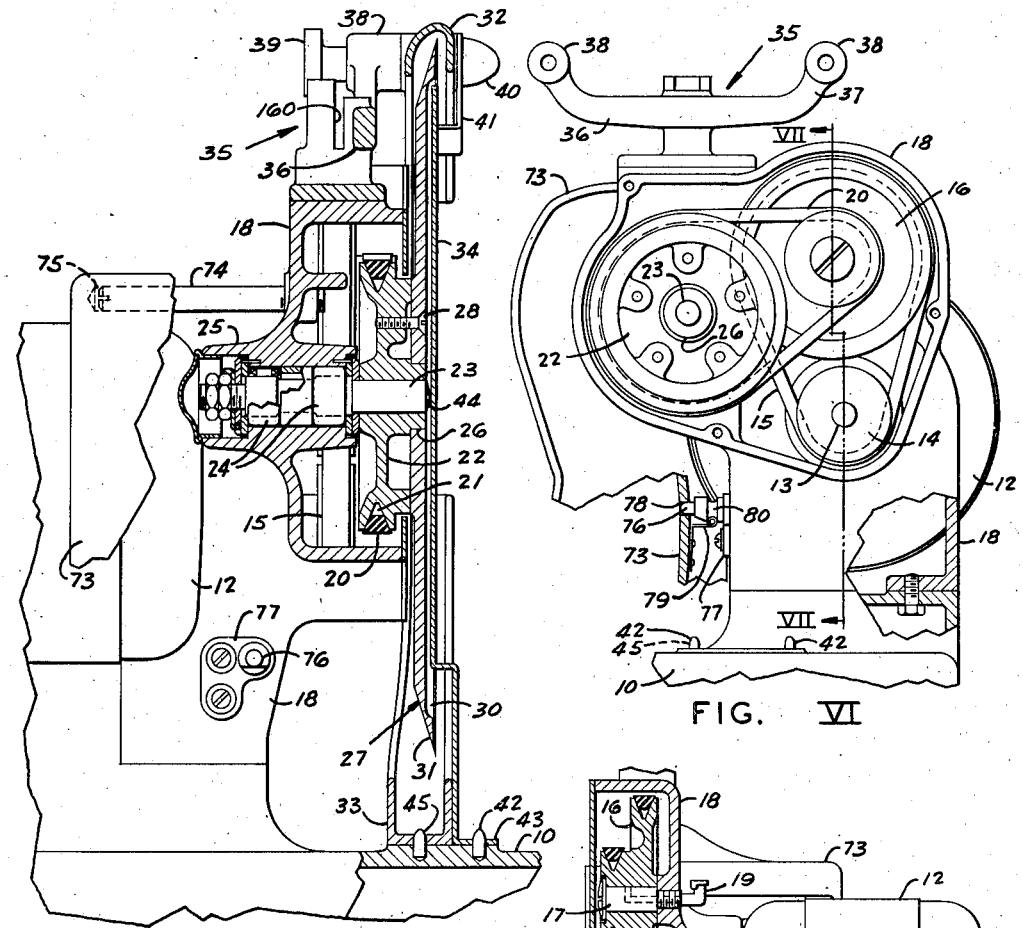
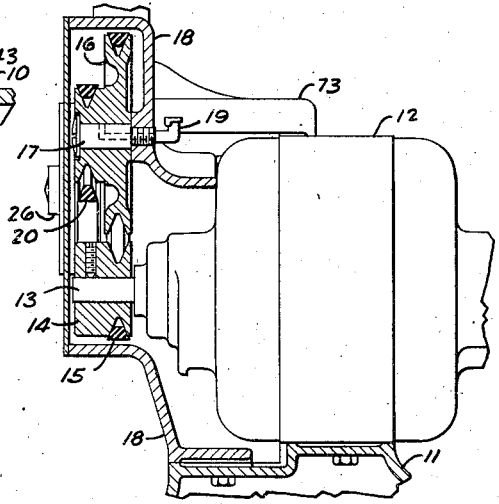

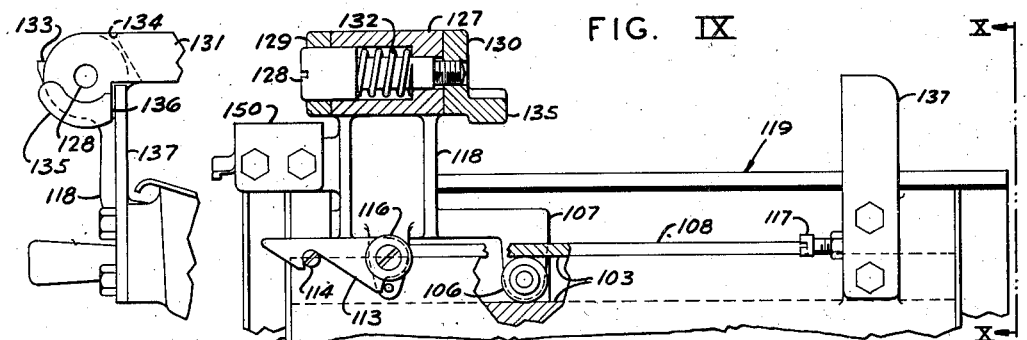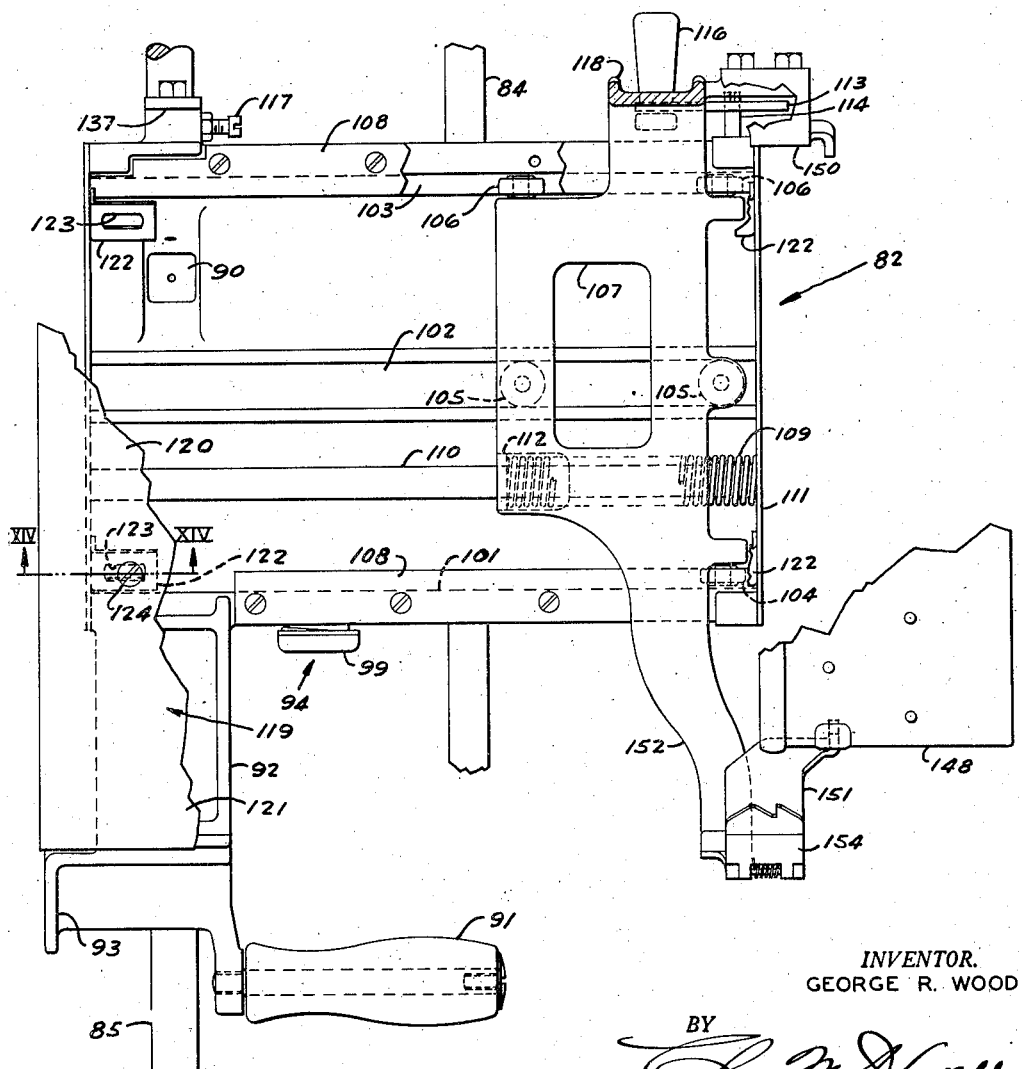

July 23, 1946.  G. R. WOOD  2,404,557
FOOD HANDLING APPARATUS
Filed April 12, 1943   8 Sheets-Sheet 7
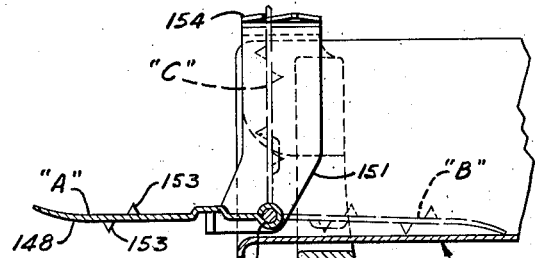
FIG. XII
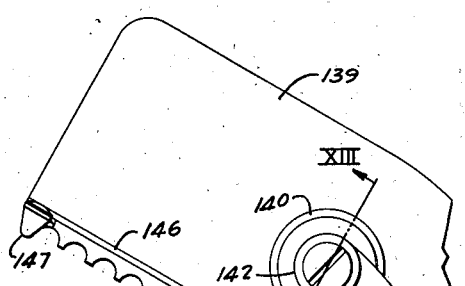
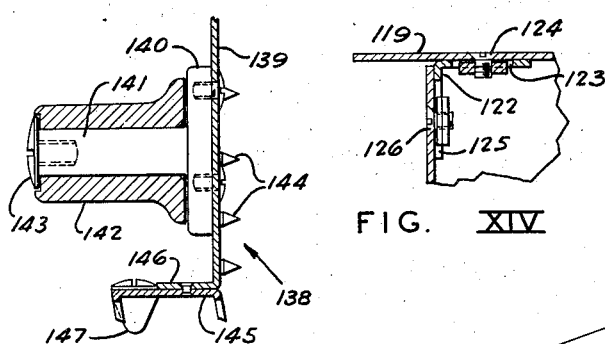
FIG. XIII   FIG. XIV
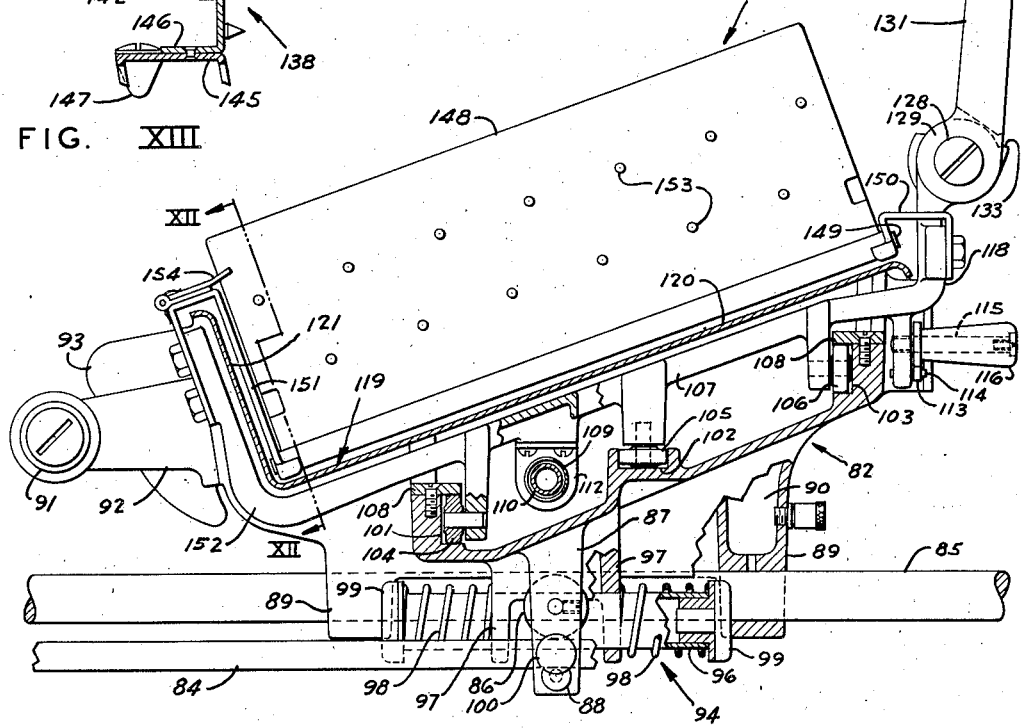
FIG. XI
INVENTOR.
GEORGE R. WOOD
BY
ATTORNEY

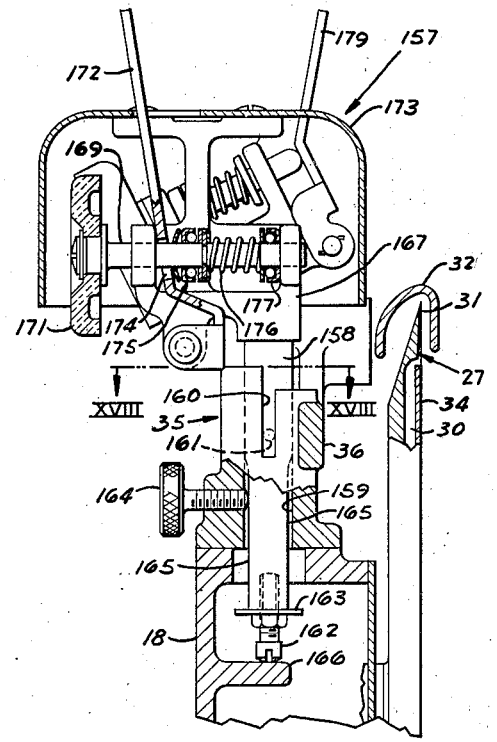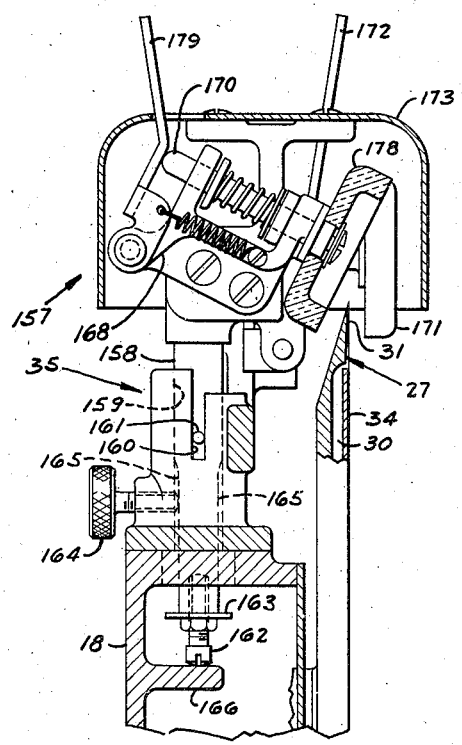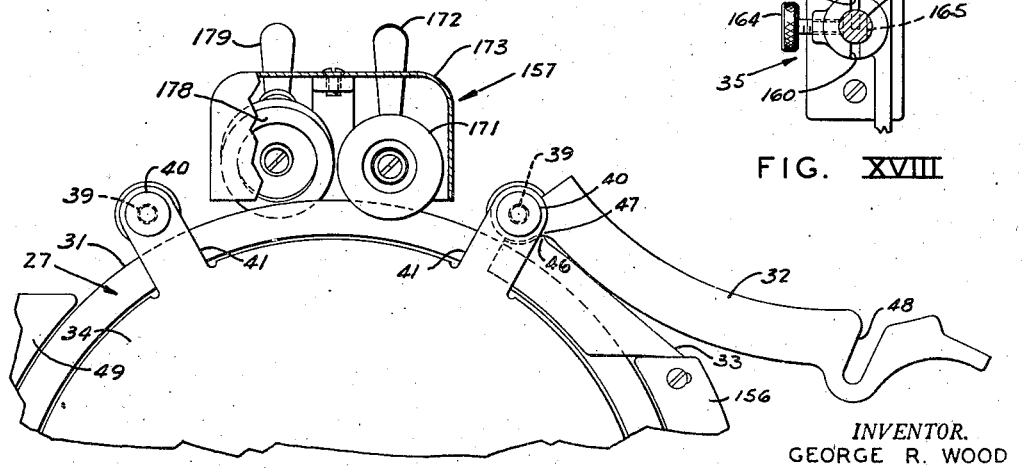

Patented July 23, 1946

2,404,557

UNITED STATES PATENT OFFICE 2,404,557

FOOD HANDLING APPARATUS

George R. Wood, Montreal, Quebec, Canada, assignor to Toledo Scale Company, Toledo, Ohio, a corporation of New Jersey Application April 12, 1943, Serial No. 482,763

6 Claims. (Cl. 146—102)

This invention relates to food handling apparatus of the type in which a commodity to be sliced is reciprocated past an exposed portion of the edge of a rotary circular knife, being slid along a thickness gauge plate lying substantially in the plane of the edge of the knife, so that a slice is severed from the commodity each time it passes the exposed portion of the knife.

A basic problem which has faced slicing machine designers has arisen from the fact that the commodities to be sliced on each machine are of many sizes and shapes, and means must be provided for holding these variously sized and shaped commodities so that they can be supported while being carried past the cutting edge of the knife and can be moved toward the plane of the knife after each slice has been severed.

It is an object of this invention to provide commodity-feeding means for a slicing machine which is adapted to handle variously shaped commodities of many different sizes.

It is a further object of this invention to provide a commodity-feeding device which is adapted to feed greasy or sticky commodities with a minimum of friction or adhesion between the commodity and the commodity-supporting member.

A further object of this invention is to provide a commodity-feeding device which is adapted to feed extremely large commodities through a distance greater than the distance through which the commodity-feeding device is moved and thus to enable the overall size of the slicing machine with which it is used to be substantially smaller than would otherwise be possible.

More specific objects and advantages are apparent from the description, in which reference is had to the accompanying drawings illustrating a preferred form of machine embodying the invention.

In the drawings:

Fig. I is a view, in elevation, of a slicing machine incorporating commodity-feeding mechanism embodying the invention.

Fig. II is a view, in elevation, of the slicing machine shown in Fig. I but taken from the opposite side of the machine and shown with commodity-carrying and feeding devices removed.

Fig. III is a fragmentary plan view of the slicing machine showing the commodity-carrying and feeding devices.

Fig. IV is a front view, partly in section and partly in elevation, of the slicing machine shown in Fig. I, taken from the right side of Fig. I.

Fig. V is a vertical sectional view, taken substantially on the line V—V of Fig. II.

Fig. VI is a fragmentary detailed view showing knife driving mechanism.

Fig. VII is a fragmentary vertical sectional view, taken substantially on the line VII—VII of Fig. VI.

Fig. VIII is a plan view of mechanism for supporting and feeding commodities, the commodity contacting tray being broken away.

Fig. IX is a fragmentary detailed view, partly in section and partly in elevation, of other parts of the commodity-supporting and feeding means.

Fig. X is a fragmentary view, in elevation, taken substantially from the position indicated by the line X—X of Fig. IX.

Fig. XI is a view, partly in section and partly in elevation, of the commodity-carrying and feeding means, taken from the right side of Fig. IV, certain parts being broken away.

Fig. XII is a vertical sectional view, taken substantially on the line XII—XII of Fig. XI, and showing a portion of the commodity-feeding mechanism in three alternative positions.

Fig. XIII is a fragmentary vertical sectional view, on an enlarged scale, taken substantially on the line XIII—XIII of Fig. XI.

Fig. XIV is a fragmentary detailed view, taken substantially on the line XIV—XIV of Fig. VIII.

Fig. XV is a fragmentary vertical sectional view, on an enlarged scale, showing sharpening mechanism employed in the slicing machine illustrated in Fig. I in its inactive position.

Fig. XVI is a view similar to Fig. XV but showing the mechanism in active position.

Fig. XVII is a fragmentary view, in elevation, on a reduced scale, taken from the right side of Fig. XVI.

Fig. XVIII is a detailed view, taken substantially on the line XVIII—XVIII of Fig. XV.

These specific drawings and the specific description that follows merely disclose and illustrate the invention and are not intended to impose limitations upon the claims.

Erected above the rear left corner of a main base 10 is a motor base 11, upon the upper end of which there is secured an electric motor 12 (Figs. I, VI and VII) which has a substantially horizontal drive shaft 13. A motor pulley 14 is secured on the end of the shaft 13 and is engaged by a driving belt 15 which also engages the larger sheave of a dual sheave pulley 16 journaled on a stub shaft 17 which is threaded into a drive housing 18 also mounted above the base 10. Lubrication of the pulley 16 is provided by means of an oil cup 19 which is connected to an oil passage in the shaft 17. A second belt 20 is engaged in the smaller sheave of the dual sheave pulley 16 and also is engaged in an annular groove 21 cut in the periphery of a knife hub 22 which is mounted on a knife shaft 23. The shaft 23 is journaled by means of roller bearings 24 in a horizontally-bored boss 25 formed in a part of the drive housing 18.

The knife hub 22 has a shouldered section 26 which extends through an aperture located at the center of a circular knife 27 secured to the hub 22 by means of five knife mounting screws 28. The motor 12 which rotates the knife 27 is controlled by a switch 29 (Fig. I) mounted on its outermost end.

The knife 27 is substantially dish-shaped, having a hollowed-out front face 30 and an annularly-shaped cutting edge 31. The knife is guarded, in order to prevent injury to the fingers of an operator, by means of a knife guard comprising a top section 32 (Fig. II), a rear section 33 and a face plate 34. The guard sections 32 and 33 are substantially U-shaped in cross section, extending around both sides of the annular cutting edge 31 of the knife. A guard supporting stand 35 (Figs. I, V and VI) is erected on top of the drive housing 18 and has two substantially horizontal arms 36 and 37. At the end of each of the arms 36 and 37 there is formed a boss 38 through which extends a thumb screw 39. Each of the thumb screws 39 is threaded into a nut 40 which is welded on one of a pair of tabs 41 of the face plate 34. The face plate 34 is held in position in the hollow face 30 of the knife 27 by means of the nuts 40 and screws 39, pins 42, which extend upwardly from the top of the base 10 and are engaged in holes in a turned-over flange 43 of the face plate 34, and a center point 44 (Fig. V) on the end of the knife shaft 23. The rear portion 33 of the knife guard is held in place around the rear of the knife 27 by means of the engagement of a pin 45, which extends upwardly from the base 10 near one of the pins 42, with a hole in the foot of the guard portion 33 and by that one of the screws 39 which passes through the boss 38 of the arm 37 and also through an ear 46 on the upper end of the guard portion 33.

The upper guard portion 32 is pivotally mounted on the thumb screw 39, there being an ear 47 formed in its rear end through which the thumb screw 39 extends. The front end of the upper guard portion 32 is supported on the other one of the thumb screws 39 which extends through the boss 38 on the arm 36 and is engaged in a slot 48 cut in the guard portion 32. The knife guard may be disassembled from around the annular cutting edge of the knife 27 by loosening the thumb screws 39 and sliding them out of the bosses 38 to disengage them from the ears 47 and 46 of the guard portions 32 and 33 respectively. The guard portion 33 and center plate 34 may then be disengaged from the pins 45 and 42.

The thickness of slices severed from a commodity reciprocated past the exposed cutting portion of the knife 27 is determined by the position of a gauge plate 49 which lies in a plane parallel to the plane of the edge of the knife 27 and is adjustable up to, and away from, such plane. The gauge plate 49 has a concave edge 50 which is substantially concentric with the knife 27 and is located closely adjacent thereto.

The gauge plate 49 is mounted on a gauge plate mounting frame 51, which is in the form of a hollow plate, by means of four mounting screws 52 which pass through horizontally elongated holes 53 in the gauge plate mounting frame 51 and are screwed into four threaded sockets 54 welded on the rear face of the gauge plate 49. The holes 53 are elongated to permit adjustment of the gauge plate 49 with respect to the gauge plate mounting frame 51 and thus to locate the edge 50 of the gauge plate concentrically with the knife 27 and to permit it to be moved radially of the knife to compensate for decreases in the diameter thereof caused by sharpening. The gauge plate mounting frame 51 is removably mounted on a pair of vertical pins 55 which extend upwardly from a gauge plate bracket 56 and enter a bored web 57 and a pair of bored bosses 58 formed on the hollow interior of the gauge plate mounting frame 51, the continuous bored web 57 serving to guide the pins into their correct locations.

The gauge plate mounting bracket 56 is secured, by means of a pair of bolts 59, to an upturned right edge of a slice-receiving platter 60 which is located at the rear of the gauge plate 49 above the base 10. The slice-receiving platter 60 is supported by means of four bored ears 61 which extend downwardly through four transversely elongated apertures 62 in the upper surface of the base 10 and are mounted on a pair of horizontal parallel shafts 63. The shafts 63 are substantially perpendicular to the plane of the face of the gauge plate 49 and are each slidable longitudinally in a pair of bored ears 64 formed on the undersurface of the base 10 and extending downwardly into the hollow interior thereof.

Rack teeth 65, which are cut in the upper surface of each of the shafts 63, are engaged by one of a pair of pinions 66 cut in an indicator shaft 67 rotatably journaled transversely to the shafts 63. The indicator shaft 67 extends exteriorly of the base 10 through an opening in the front wall thereof and has an indicator knob 68 secured to its outermost end. A small coiled spring 69 surrounds the shaft 67, being compressed between the inside of the front wall of the base 10 and a washer 70 on the shaft 67 to furnish sufficient friction to hold the shaft 67 stationary unless rotated by the knob 68. A series of indicia 71 scribed on the conical periphery of the knob 68 cooperates with an index 72 to indicate the relative position of the gauge plate 49 with respect to the plane of the knife 27 and thus the thickness of the slices of commodity to be severed.

When the gauge plate 49 is moved to the limit of its travel to the left in Fig. IV, it can be removed from the bracket 56 to facilitate its cleaning by sliding it off the pins 55.

Slices of commodity severed by the knife 27 are deflected onto the slice-receiving platter 60 by a formed deflector plate 73 (Figs. I and IV) which is mounted on the forward side of the drive housing 18 and motor 12. The deflector plate must be closely adjacent the rear edge of the knife 27 so that slices of commodity, no matter how thin, will be "peeled" from the knife and deflected onto the platter 60. In addition it is desirable that the deflector plate be removable so that the rear surface of the knife may be thoroughly cleaned of grease and fat which collects thereon. The deflector plate is mounted by means of a rod 74 (Fig. V) which is studded in the left wall of the drive housing 18 substantially parallel to the knife shaft 23. The rod 74 is engaged in a bore 75 which is located near the upper end of the deflector plate 73. The deflector plate 73 is held in position, and its position is adjusted with respect to the knife 27 by means of a shouldered pin 76 (Figs. V and VI) which is mounted on a bracket 77 adjustably secured to the lower front wall of the drive housing 18. The pin 76 is engageable with a hole 78 bored through the deflector plate 73 and held therein by the engagement of a small clip 79 in a groove 80 cut in the body of the pin 76. By adjusting the position of the bracket 77 and pin 76, the proximity of the edge of the deflector plate 73 to the rear face of the knife 27 can be adjusted. By disengaging the pin 76 from the hole 78, the deflector plate 73 can be slid off the rod 74 and removed from the machine to be cleaned and, in combination with the removal of the guard portions 32 and 33, the face plate 34 and the gauge plate 49, to expose the entire edge and front face and a large portion of the rear face of the knife 27 for cleaning.

Commodities to be sliced are carried past the exposed forward portion of the knife 27 by means of a commodity tray 81 (Figs. IV and XI). The commodity tray 81 comprises a commodity tray carriage 82 which is mounted for reciprocation on a line substantially parallel to the plane of the edge of the knife and of the gauge plate. Two rail supporting brackets 83 (Fig. II) are secured on the upper surfaces of the base 10 at the right side of the slicing machine. Two parallel rails 84 and 85 are mounted on the brackets 83 and extend substantially horizontally along the base 10. The commodity tray carriage 82 is mounted on the rails 84 and 85, being supported on the rail 84 by a "wheelbarrow" roller 86 (Figs. IV and XI) which is journaled on a horizontal axis in a fork 87 extending downwardly from the commodity tray carriage 82 and which rolls on the upper surface of the rail 84. The roller 86 is located approximately beneath the center of gravity of the commodity tray 81 so that most of the weight of the tray and the commodity carried thereby is supported by such roller.

A pin 88 extends between the legs of the fork 87 parallel to the axis of the roller 86 but beneath the rail 84 to prevent the commodity tray from being lifted off the rail 84. The commodity tray carriage 82 is guided by means of a pair of sleeves 89 which are formed on the underside of the carriage 82 and slidingly engaged around the rail 85. The sleeves 89 and rail 85 are spaced horizontally a substantial distance from the rail 84 so that very little of the load on the carriage is supported by the rail 85 and a wide base of support for guiding the carriage is afforded. The rail 85 is lubricated from an oil reservoir 90 (Fig. XI) which is formed in the hollow interior of that portion of the carriage 82 forming one of the sleeves 89.

The commodity tray carriage is reciprocated by means of a handle 91 which is mounted on the forward end of a handle bracket 92 extending upwardly and forwardly from the commodity tray carriage 82. A thumb guard 93 is integrally cast with the handle bracket 92 and affords protection for the operator's thumb when the carriage is moved entirely past the exposed edge of the knife 27. The limits of reciprocation of the carriage 82 are established by the engagement of a bumper 94 with either one of a pair of stops 95 (Fig. II), one of which is a portion of each of the supporting brackets 83. The bumper 94 comprises a tube 96 which is mounted parallel to the rails 84 and 85 in a pair of bored ears 97 which extend downwardly from the commodity tray carriage 82 between the fork 87 and sleeves 89. The tube 96 is longitudinally slidable in the ears 97 and is held in its central position by means of a pair of coiled springs 98, one of which surrounds each of its ends, being located between a flanged end of the tube 96 and the respective ear 97. A rubber cushion 99 is mounted at each end of the tube 96. When the carriage reaches the end of its path, one of the cushions 99 strikes one of the stops 95 and that one of the springs 98 located at the end of the rod which has struck the stop 95 is compressed to ease the abrupt shock of engagement and upon expansion to initiate the movement of the carriage in the opposite direction. The carriage can be locked in any desired position on the rails by means of a set screw 100 (Figs. IV and XI) threaded through one leg of the fork 87 and engageable with the side of the rail 84.

Three substantially parallel and horizontal rails 101, 102 and 103 are formed on the upper spider-like surface of the commodity tray carriage 82 and extend transversely across the carriage. The rails 101, 102 and 103 serve as tracks for a roller 104, a pair of rollers 105 and a pair of rollers 106 respectively which are journaled in a commodity clamp frame 107 (Figs. VIII, IX and XI). The rail 102 is in the form of a U shaped channel member open at the top, and the rails 101 and 103 are supplied with flat retainers 108 which form one side of U shaped channel members open at the side and are removable to permit the removal of the frame 107. The two rollers 106 are journaled on horizontal axes and prevent rotation of the frame 107 on a horizontal line substantially parallel to the plane of the knife and gauge plate. The two rollers 105 are journaled on vertical axes and prevent rotation of the frame 107 on a vertical line substantially parallel to the knife and gauge plate. The roller 104 is journaled on a horizontal axis and prevents rotation of the frame 107 on the third major axis, i. e., a line substantially perpendicular to the plane of the gauge plate and the knife.

The commodity clamp frame 107 is urged to the left by the bias of a coil spring 109 which surrounds a rod 110 mounted in the gauge plate carriage 82 substantially parallel to the rails 101, 102 and 103 and which abuts against a sidewall 111 at the outerside of the carriage 82 and a collar 112 secured to the underside of the frame 107 through which the rod 110 extends. The frame 107 can however be locked at the right side of the carriage 82 by means of the engagement of a latch 113 (Fig. IX) with a pin 114 extending horizontally from the back of the carriage 82. The latch 113 is swivelable on a pin 115 (Fig. XI) which is studded into a portion of the frame 107 and is releasable by means of a handle 116 secured to the latch 113 and journaled on the pin 115. The limit of travel of the frame 107 to the left is established by a set screw 117 which is engaged by a portion of an arm 118 of the frame 107 when the frame is moved to the left.

The arm 118 of the frame 107 extends upwardly to the rear of the frame above the rear edge of a trough-shaped commodity-carrying plate 119 (shown in cross section in Fig. XI and partly broken away in Fig. VIII). The plate 119 has a long flat face 120 which extends upwardly at a slight angle to the horizontal, toward the rear of the carriage 82 on the upper surface of which the plate 119 is mounted, and a short face 121 which extends upwardly substantially at right angles to the face 120 and is located at the front of the carriage 82 immediately back of the handle bracket 92. The plate 119 is mounted on the carriage 82 by means of a plurality of angular clips 122 (Figs. VIII and XIV) which have elongated apertures 123 in their horizontal arms and bolts 124 which extend downwardly through the plate 119 and the apertures 123. The vertical arms of the clips 122 have forked ends 125 between the bifurcations of which extend bolts 126 inserted through holes in the side walls of the carriage 82. The plate 119 supports the various commodities which are to be sliced on the machine, and, in order to prevent their sagging between the edge of the plate 119 and the gauge plate, the left edges of the faces 120 and 121 of the plate 119 extend closely adjacent the plane of the edge of the knife 27. The apertures 123 in the clips 122 are elongated to permit adjustment of the position of the plate 119 with respect to such plane.

On the upper end of the arm 118 of the commodity clamp frame 107 is a counterbored horizontal boss 127 through which extends a shouldered shaft 128 which also extends through a hole in an arm 129 and is threaded into an arm 130 of the bifurcated rear end of a clamp arm 131. A small spring 132 surrounds the shouldered shaft 128 and is slightly compressed between the shoulder on such shaft and the bottom of the counterbore in the boss 127 to furnish friction to hold the clamp arm 131 in the position shown in Fig. XI when it is lifted out of the commodity tray. A shoulder 133 (Fig. X) on the boss 127 is engaged by a corner 134 on the arm 131 between the bifurcations thereof to limit the upward swing of the clamp 131. A substantially C shaped stop 135 is formed on the side of the arm 130 and has a flat end 136 (Fig. X) which, when the frame 107 is moved to the left, slides behind an upwardly extending stop 137 secured on the rear of the carriage 82 to prevent the clamp arm 131 from being swung upwardly when a clamp 138 (Fig. XI) carried thereby is adjacent the plane of the gauge plate and the knife and would, if swung upwardly, damage the knife guard and other mechanism surrounding the knife.

The clamp 138 comprises a flat plate 139 to which is riveted a disk 140 carrying a stub shaft 141. The stub shaft 141 is journaled in a bored boss 142 formed in the end of the clamp arm 131 and held therein by a screw 143 which is threaded into the end of the shaft 141. The face of the plate 139 lies in a plane parallel to the planes of the gauge plate and of the edge of the knife 27. A plurality of commodity engaging points 144 are riveted to the front face of the plate 139, and a substantially U shaped pronged member 145 is riveted to a horizontally-turned flange 146 of the plate 139. A pair of buttons 147 are riveted one at each end of the member 145 extending downwardly below the ends of the prongs thereon to slide along the surface of the face 120 to protect the face from injury by the prongs on the member 145 when the clamp 138 is swung downwardly into commodity pushing position. The clamp 138 may be dropped on flat commodities, such as bacon, to clamp them down on the face 120 and, by engagement with the pronged member 145 therewith, to slide them toward the gauge plate. The face of the plate 139 is placed behind commodities, such as meat loaves, etc., to push them across the face of the plate 119 toward the gauge plate.

To cooperate with the clamp 138 in the handling of various types of larger size commodities, there is provided an end plate 148 which is journaled on a pin 149 mounted at the lowermost ends of two brackets 150 and 151 secured to the arm 118 and a second arm 152 of the clamp frame 107 respectively. The end plate 148 is provided with a plurality of meat-engaging points 153 on each of its faces and, being swivelably mounted on the pin 149, may be placed in any one of the three positions shown in Figs. III and XII to handle commodities in the following ways:

*Position A.*—When in the position shown in solid lines it serves as an extension for the plate 119 to support the ends of long commodities, such as slabs of bacon, which would otherwise sag down over the end of the plate 119, thus creating friction rendering the feeding of the commodity more difficult. Also in this position the prongs 153, which extend upwardly, engage the undersurface of the commodity being handled and assist the prongs on the member 145 of the commodity clamp 138 to feed the commodity toward the gauge plate.

*Position B.*—When in the second horizontal position the end plate 148 cooperates with the clamp 138 to engage a flat commodity on both its upper and lower surfaces and also furnishes an "easy-ride" attachment to break the suction between the undersurfaces of greasy commodities and the face 120 of the plate 119, as the commodities are moved toward the gauge plate.

*Position C.*—In vertical position (in which it is held by the engagement of its edge with a hinged latch 154 mounted on the bracket 151) the end plate 148 serves as an auxiliary pusher for feeding commodities which are too long to be inserted in front of the plate 139 of the clamp 138. For example, a long meat loaf may be placed in the tray and the end plate 148 put in its "C" position with the clamp 138 moved out of the tray (as shown in Fig. XI). When the latch 113 is released and the clamp frame 107 moved toward the gauge plate, the end plate feeds the commodity toward the gauge plate until the arm 118 of the frame 107 hits the stop screw 117. At this point the end plate has reached a position slightly to the left of the position in which the plate 139 is shown in Fig. IV. The commodity clamp frame 107, end plate 148 and clamp 138 are then moved to the right and the clamp 138 swung downwardly behind the end of the commodity to continue feeding it toward the gauge plate as slices are severed therefrom until the frame 107 again strikes the stop screw 117 at which time the plate 139 of the commodity clamp has reached the edge of the commodity-supporting plate 119 immediately adjacent the plane of the edge of the knife 27.

Because the edge of the commodity-supporting plate 119 must be so closely adjacent the plane of the knife, and because the commodity tray must be moved entirely past the cutting edge of the knife in order completely to sever slices of commodities, provision must be made for the rear end of the face 120 of the commodity-carrying plate 119 to clear the rear guard portion 33. For that reason the rear guard portion has a cutout section 155 and the end of the commodity tray is moved through the space thereby afforded. However since cutting out this portion of the guard exposes a segment of the edge of the knife 27, an arcuate edge guard 156 is mounted on the guard portion 33 with its innermost curved edge closely adjacent the edge of the knife 27 and is adjustable radially of the knife to compensate for decreases in the diameter thereof due to sharpening.

The rotary knife 27 is sharpened by means of a sharpening attachment 157 which is movable from its inactive position shown in Fig. XV to its active position shown in Fig. XVI when the upper guard portion 32 is thrown back out of the way as shown in Fig. XVII. In order to move this upper guard portion into the position shown in Fig XVI, the knurled screws 39 must be loosened to free the front end of the guard portion 32 from that one of the screws 39 in the arm 36 and allow it to be pivoted on the other of the screws 39.

The sharpening attachment 157 is mounted on the uppermost end of a vertically slidable post 158 which is located in a bore 159 in the center of the bracket 35 on the upper end of the drive housing 18. Two vertical slots 160 are cut in the walls of the bracket 35, and a pin 161 is engageable in one or the other of such slots depending upon whether the sharpening device is in active or in inactive position. The vertical movement of the sharpening device is limited by a set screw 162 threaded into the lower end of the post 158 and by a washer 163 surrounding the screw 162. A set screw 164, threaded horizontally through the bracket 35, is engageable with either of two flats 165 cut on the sides of the post 158 to lock the sharpening device in its active or inactive position.

To move the sharpening device from its inactive position as shown in Fig. XV to its active position as shown in Fig. XVI the following steps are taken: The set screw 164 is loosened and the sharpening device is pulled upwardly until the washer 163 engages the underside of the bracket 35, at which time the pin 161 is free of that one of the slots 160 in which it was inserted. The sharpening device is then swiveled horizontally until the pin 161 engages the other one of the slots 160 and then the sharpening device is lowered until the pin 162 engages a stop 166 in the interior of the drive housing 18.

The sharpening device comprises a pair of invented substantially U shaped brackets 167 and 168 in the arms of each of which there is journaled a shaft 169 or 170 respectively. The shaft 169 passes through the two arms of the frame 167 and carries on one end a finishing wheel 171 which is movable into contact with the flat edge of the knife 27 (when the device is in active position) by a lever 172 hinged to the bracket 167 and extending upwardly through an opening in a cover 173 located over the sharpening device.

The lever 172 has a hole 174 through which the shaft 169 extends. The shaft 169 bears against a washer and ball bearing 175 which in turn compress a spring 176 against a second washer and ball bearing 177 when the lever 172 is moved to bring the finishing wheel into contact with the knife. A grinding wheel 178 is somewhat similarly mounted on the shaft 170 and is actuated by a lever 179 which is hinged in the bracket 168 and extends upwardly out of the cover 173. The knife thus may be sharpened by squeezing the two levers 172 and 179 toward each other, which moves the two wheels toward the knife from opposite sides thereof. When the knife has been sharpened, the sharpening device is swung into inactive position, removing the wheels from above the edge of the knife so that they will not be smeared by grease or fat thrown therefrom and the upper guard portion 32 is swung back into position to guard the edge of the knife.

The embodiment of the invention that has been disclosed may be modified to meet various requirements.

Having described my invention, I claim:

1. Commodity feeding means for a slicing machine having a commodity tray reciprocable past an exposed cutting edge of a rotary circular knife comprising a frame movable along said tray and generally perpendicular to the path of reciprocation of said tray, an arm pivotally mounted at one end on said frame, a pusher plate mounted on the other end of said arm, said pusher plate having commodity engaging members in at least one of its faces and in at least one of its edges, and a plate overlying said tray and hinged on said frame near that end of said frame farthest removed from the plane of the edge of said knife, the last mentioned plate having commodity engaging projections on its faces and being movable to at least two different positions, a first position being with its face in a plane substantially parallel to the face of the first mentioned plate and to the plane of the edge of said knife, a second position being substantially horizontal and closely overlying said tray.

2. Commodity feeding means for a slicing machine having a commodity tray reciprocable past an exposed cutting edge of a rotary circular knife comprising a frame movable along said tray and generally perpendicular to the path of movement of said tray, an arm pivotally mounted at one end on said frame, a pusher plate mounted on the other end of said arm, said pusher plate having commodity engaging members in at least one of its faces and in at least one of its edges, and a plate hinged to said frame along a line parallel to the plane of said knife at a point near that end of said frame farthest removed from the plane of the cutting edge of said knife and adapted to be positioned horizontally in either of two positions, said plate in one position closely overlying said tray and adapted to support a commodity being fed by said commodity engaging member from said tray and in the other position extending beyond the end of said tray for supporting the end of a long commodity being fed by said commodity engaging member.

3. Commodity feeding means for a slicing machine having a commodity tray reciprocable past an exposed cutting edge of a rotary circular knife comprising a frame movable along said tray perpendicularly to the path of movement of said tray, an arm pivotally mounted at one end on said frame, a pusher plate mounted on the other end of said arm, said pusher plate having commodity engaging members in at least one of its faces and in at least one of its edges, and a plate hinged to said frame along a line generally parallel to the plane of said knife at a point near that end of said frame farthest removed from the plane of the cutting edge of said knife and adapted to be positioned in any one of three positions, said plate in one position horizontally overlying said tray and adapted to support a commodity being fed by said commodity engaging member and in a second position extending horizontally beyond the end of said tray for supporting the end of a commodity being fed and in a third position being vertical with its face substantially parallel to the face of said commodity engaging member for feeding a commodity toward said knife until the rear end of such commodity is moved to a position where said commodity engaging member can be placed therebehind for feeding the remaining portion of such commodity toward said knife.

4. Commodity feeding means for a slicing machine having a commodity tray reciprocable past an exposed cutting edge of a rotary circular knife comprising a frame movable across said tray along a line perpendicular to the path of said tray, an arm pivotally mounted on said frame, a first commodity engaging member carried on said arm, a flat commodity engaging member hinged to said frame along a line closely overlying said tray and parallel to the plane of the knife, said second member being movable to various positions including a generally horizontal position parallel to and overlying said tray and an upright position parallel to the plane of said knife.

5. Commodity feeding means for a slicing machine having a commodity tray reciprocable past an exposed cutting edge of a rotary circular knife comprising a frame movable along said tray and perpendicularly to its path of movement, an arm pivotally mounted on said frame, a first commodity engaging member carried on said arm, a flat commodity engaging member hinged to said frame along a line overlying said tray and generally parallel to the plane of the knife, said second member being movable to various positions including a first horizontal position parallel to said tray and a second upright position perpendicular to said tray, said first and second commodity engaging members cooperating to clamp and feed a commodity when said second member occupies its first position and to successively feed a long commodity when said second member occupies its second position.

6. In a slicing machine having a commodity tray mounted for reciprocation past an exposed cutting edge of a rotary circular knife, in combination, a frame movable along said tray perpendicularly to the path of movement of said tray, a pusher plate mounted from said frame and movable with said frame to a position closely adjacent said knife, said pusher plate also being rotatable to an inactive position above said tray, and a flat plate hinged to said frame along a line parallel to the knife and more remote therefrom than said pusher plate, said hinged plate being adapted to serve as an auxiliary commodity support or as a pusher until the commodity is reduced to a length engageable by said pusher plate.

GEORGE R. WOOD.